(12) United States Patent
Krzyzanowski et al.

(10) Patent No.: US 8,390,473 B2
(45) Date of Patent: Mar. 5, 2013

(54) SYSTEM, METHOD AND APPARATUS FOR ADVANCED UTILITY CONTROL, MONITORING AND CONSERVATION

(75) Inventors: Paul Krzyzanowski, Flemington, NJ (US); David Barclay, Millbrae, CA (US)

(73) Assignee: Openpeak Inc., Boca Raton, FL (US)

( * ) Notice: Subject to any disclaimer, the term of this patent is extended or adjusted under 35 U.S.C. 154(b) by 614 days.

(21) Appl. No.: 12/581,750

(22) Filed: Oct. 19, 2009

(65) Prior Publication Data

US 2010/0156665 A1 Jun. 24, 2010

Related U.S. Application Data

(60) Provisional application No. 61/139,090, filed on Dec. 19, 2008.

(51) Int. Cl.
*G08B 23/00* (2006.01)
*G08C 15/06* (2006.01)
(52) U.S. Cl. .............. 340/870.02; 340/870.01
(58) Field of Classification Search ............. 340/870.02, 340/870.01, 635
See application file for complete search history.

(56) References Cited

U.S. PATENT DOCUMENTS

| | | | |
|---|---|---|---|
| 6,069,571 A * | 5/2000 | Tell | 340/870.02 |
| 7,746,360 B2 | 6/2010 | Ubillos et al. | |
| 7,804,508 B2 | 9/2010 | Ubillos et al. | |
| 7,889,212 B2 | 2/2011 | Schulz et al. | |
| 7,902,995 B2 * | 3/2011 | Kim | 340/870.02 |
| 2007/0222636 A1 * | 9/2007 | Iwamura | 340/870.01 |
| 2009/0040057 A1 * | 2/2009 | Keyghobad et al. | 340/635 |
| 2009/0109056 A1 * | 4/2009 | Tamarkin et al. | 340/870.02 |
| 2012/0033611 A1 * | 2/2012 | Wu | 370/328 |

FOREIGN PATENT DOCUMENTS

| | | |
|---|---|---|
| GB | 2 451 001 A | 1/2009 |
| WO | WO 2008/131781 A2 | 11/2008 |
| WO | WO 2009/097400 A1 | 8/2009 |

OTHER PUBLICATIONS

"Itron and OpenPeak Partner to Allow Utilities and Their Customers to More Actively Manage In-Home Energy Consumption," Itron Pess Release (Sep. 14, 2009), XP002634943, retrieved from the Internet: URL:https://www.itron.com/newsAndEvents/Pages/Itron-and-OpenPeak-Partner-to-Allow-Utilities-and-Their-Customers-to-More-Actively-Manage-In-Home-Energy-Consumption.aspx (retrieved on Apr. 27, 2011).
"OpenPeak Debuts New Home Energy Management Solution for Utilities to Help Consumers Save Energy, Money and the Environment," Goliath—PR Newswire (Jun. 29, 2009) XP002634944, Retrieved from the Internet: URL:http:/goliath-ecnext.com/coms2/gi_0199-10872852/OpenPeak-Debuts-New-Home-Energy.html (retrieved on Apr. 27, 2011).
International Search Report issued Jun. 22, 2011 for Appl. No. PCT/US2010/053213, 5 pages.
Written Opinion of International Searching Authority issued Jun. 22, 2011 for Appl. No. PCT/US2010/053213, 6 pages.

* cited by examiner

*Primary Examiner* — Peguy Jean Pierre
(74) *Attorney, Agent, or Firm* — Sterne, Kessler, Goldstein & Fox P.L.L.C.

(57) ABSTRACT

The present application is directed to a system and method of providing flexible real-time two-way energy control and monitoring between utility providers and consumers. Consumer friendly nodes permit communication of targeted information and control, while permitting the utility provider to remotely communicate and control in a real-time environment. Data collection of and accessibility by a community of utility consumers provides social feedback through comparative usage statistics.

21 Claims, 11 Drawing Sheets

SYSTEM, METHOD AND APPARATUS FOR ADVANCED UTILITY CONTROL, MONITORING AND CONSERVATION

RELATED APPLICATION

This application is related to U.S. Provisional Patent Application No. 61/139,090 ("the '090 application"), filed Dec. 19, 2008, entitled "System, Method and Apparatus for Providing Telephony and Digital Media Services". The contents of the '090 application is incorporated herein in its entirety by reference.

BACKGROUND

1. Field of the Invention

The present invention relates to utility metering, and in particular to utility control, monitoring and conservation using real-time communication and feedback through comparative usage statistics.

2. Background Art

Usage measurement by utility providers is a routine process whereby utility providers seek to measure the usage of the commodity involved (e.g., water, gas, electricity) by each consumer. Consumers are then billed based on their usage at periodic times, typically monthly. Traditionally, usage was measured manually by utility workers who visited each point-of-use location and read the utility meter to ascertain the usage since the previous reading. In fact, the oldest style utility meters supported only visual reading. Such manual measurements posed a variety of issues, such as the time and cost of visiting every meter each month, obtaining access to each meter during difficult weather conditions, as well as the cost of human error in reading the meters and the resulting public relations consequences.

The next generation meters, known as automatic meter reading ("AMR") devices, were designed to offset the above manual meter reading issues. AMR devices permit automated or semi-automated reading of meters as an alternative to having the utility workers physically access every meter each month. Various technologies are used for AMR meter readings including radio and powerline networking links. By using these various technologies to remotely read every meter, the cost of human access and human error are substantially reduced. For example, utility workers can use handheld computers coupled with short range transceivers to remotely interrogate every meter from the street. The AMR approach avoids the need for the same level of physical access to each meter, automates the entry of each meter reading, and reduces the likelihood of reading and transcription errors.

More advanced AMR devices use electronic communication such that each meter device can communicate directly to the utility company computer systems, without the need for a utility worker to physically approach every meter each month. Such electronic communication takes the form of either wired or wireless communications. Wired communications includes telephone line connectivity, as well as power-line communications to forward the usage data back to the utility company computers. Wireless communications includes the use of radio frequencies (RF) and other suitable high frequencies for data transmission to the utility company computers. The choice between wired and wireless communications is typically driven by density of meter locations in a given area, as well as by the existence of telephone wiring in the particular area.

Thus, in its various forms, AMR devices provide a more cost-effective and less error-prone approach to the routine collection of utility usage data. However, new utility challenges have arisen that expose the limitations of AMR devices. For example, the limited communications bandwidths used by AMR devices do not enable utility companies to readily receive usage data on a more frequent basis. As such, access to additional data such as usage over various times of the day at each location is thwarted by low bandwidth connectivity between each meter location and the utility company. Thus, the modern-day need for utility companies to better understand the usage profile of each customer demands receipt of real-time data, and thus a real-time communications protocol. In addition, the passage by Congress of the Energy Policy Act of 2005 mandates that each public utility regulator consider the provision of a time-based rate schedule. Time-based rate schedules provide utility commodities (e.g., electricity, water, gas) at variable prices during a 24-hour period, with higher prices being charged during peak loading periods. For a customer to be able to take advantage of time-based rate schedules, utilities are thereby challenged to provide advanced metering, control and communications technologies.

The initial response to these challenges and the Congressional legislation has been the latest generation of meters, namely the Advanced Metering Infrastructure ("AMI") meters. Unlike AMR meters, AMI meters offer two-way communication between the meter and the utility company. Usage data is transmitted to the utility company, while messages are forwarded to the customer from the utility company. In addition, AMI meters can also control and/or monitor home appliances by communicating to the home appliances using a short range wireless protocol, such as Zigbee wireless protocol. Communication between the numerous AMI meters and the utility company creates a communications network topology. The AMI network topology is typically a mesh structure formed by each of the AMI meters in a particular area.

AMI meters are often referred to as "smart meters" since they can store data over a period of time for subsequent retrieval and transmission. However, the bandwidth of an AMI meter and its associated communications network are typically narrow, and therefore data updates to and from the utility company are slow. For example, data updates may be limited to being no faster than every 15 minutes. Thus, real-time load management is not available to the utility company. In addition, the ability for customers to receive and view real-time usage data also limits their understanding of actual usage patterns over a typical day. Thus, such narrow bandwidths preclude meaningful real-time management by the utility company as well as the comprehensive understanding of real-time customer usage so necessary to take advantage of the Congressionally-mandated variable pricing schedules.

Thus, although AMI meters are capable of storage and subsequent transmission of usage data over a range of periods of time, various usage, control and conservation challenges are left unaddressed.

BRIEF SUMMARY

What is needed is a system, apparatus and method to provide real-time management of utility loads on a per-customer basis, as well as receive real-time usage data to facilitate better understanding of customer usage. In addition, it is desirable that customers can control their appliances to take advantage of variable rate schedules offered by the utility companies. Further, it is desirable that customers receive comparative usage data on a regular basis in order to make and implement informed changes in their utility usage patterns.

In one embodiment of the present invention, a legacy AMR meter can be provided with two-way communication functionality. An IP multi-media device communicates with the AMR meter using the particular interface the AMR meter supports. The interface includes Zigbee, 900 MHz and narrowband powerline network interfaces. The IP multi-media device in turn communicates with the central monitoring station and forwards usage data to the central monitoring station. Using its bidirectional communication link, the IP multi-media device also receives commands from the central monitoring such as meter reading requests. In an optional embodiment, the IP multi-media device also communicates with controllable appliances on the consumer premises. Controllable appliances include thermostats, HVAC systems, hot-water heaters, etc. Communication with the controllable appliances includes providing monitoring/control commands using a suitable communication interface, e.g., a Zigbee transceiver with a Smart Energy Profile. The IP multi-media device can receive remote utility management commands (e.g., for demand-response control) from the central monitoring station and forward appropriate monitoring/control commands to the controllable appliances in response to the remote utility management commands.

In a further embodiment of the present invention, a communications device (or IP multi-media device) is provided that receives usage data from a utility meter (which can be any form of utility meter having the ability to communicate, including an AMR or an AMI meter), and forwards this data to a central monitoring station using a real-time communications link. Using the same real-time communications link, the communications device receives control signals, data and information from the central monitoring station. In an optional embodiment, the data and/or information is displayed on a visual interface.

In a still further embodiment of the present invention, the communications device (or IP multi-media device) includes a processing device which can be algorithmically programmed to respond to received control signals, data and information from the central monitoring station. Such algorithmic response includes adjusting one or more appliances in response to a particular customer profile. Real-time usage in excess of certain goals can result in powering down appliances.

In a still further embodiment of the present invention, the communications device (or IP multi-media device) forwards the received usage data to a data aggregator using a real-time communications link. Using the same real-time communications link, the communications device receives aggregated data and/or statistical data (e.g., peer group usage data) from the data aggregator. Based on the received aggregated data and/or statistical data, the data can be displayed on a visual interface of the communications device and/or actions can be taken in response to the received data, such as providing instructions to one or more appliances.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

Embodiments of the present invention are described with reference to the accompanying drawings. In the drawings, like reference numbers indicate identical or functionally similar elements.

FIG. 1 depicts an AMR-based system and infrastructure.
FIG. 2 depicts an AMI-based system and infrastructure.
FIG. 3 illustrates an advanced control, monitoring and conservation solution, according to an embodiment of the current invention.

FIG. 4 illustrates a user interface of an advanced control, monitoring and conservation solution, according to an embodiment of the current invention.
FIG. 5 illustrates a further user interface of an advanced control, monitoring and conservation solution, according to an embodiment of the current invention.
FIG. 6 illustrates another user interface of an advanced control, monitoring and conservation solution, according to an embodiment of the current invention.
FIG. 7 illustrates another user interface of an advanced control, monitoring and conservation solution, according to an embodiment of the current invention.
FIG. 8 illustrates another user interface of an advanced control, monitoring and conservation solution, according to an embodiment of the current invention.
FIG. 9 illustrates a further advanced control, monitoring and conservation solution using a database aggregator, according to an embodiment of the current invention.
FIG. 10 provides a flowchart of a method that uses an advanced control, monitoring and conservation solution, according to an embodiment of the current invention.
FIG. 11 is a diagram of a computer system on which the methods and systems herein described can be implemented, according to an embodiment of the invention

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Introduction

FIG. 1 depicts an AMR meter-based infrastructure 100. AMR meter 110 measures usage of the utility's commodity (e.g., electricity, water, gas) and displays the cumulative usage on its display to facilitate visual reading. In addition, AMR meter 110 communicates usage to a utility company 130 through an AMR communications path 120. AMR communications path 120 can include a handheld device, drive-by a utility employee or by a fixed network (e.g., mesh network). The handheld device, utility employee and the fixed network use narrow bandwidths at authorized frequencies such as 900 MHz to effect the required one-way communications of usage data.

FIG. 2 depicts an AMI infrastructure 200. In such an infrastructure, both AMR meters 110 and AMI meters 210 co-exist in such an infrastructure. As before, AMR meter 110 communicates usage to a utility company 230 through the use of a communications path; in this case, the communications path is provided by AMI communication path 220. Like AMR meter 110, AMI meter 210 measures usage of the utility's commodity (e.g., electricity, water, gas), displays the cumulative usage on its display, and communicates usage back to utility company 230 through AMI communications path 220. Unlike AMR communications path 120, AMI communications path 220 is a two-way communications path such that utility company 230 can use to forward control signals and other information to each consumer. Although the communications in AMI infrastructure 200 are two-way, AMI communications path 220 also uses narrow bandwidths such as 900 MHz to effect the required two-way communications. As such, the two-way communications are slow and the provision of modern day functionality is limited.

AMI meter 210 also communicates using intra-customer communications path 250 with appliances 240a through 240z located in the customer's premises. For example, AMI meter 210 communicates with thermostat 240a. Intra-customer communications path 250 uses protocols such as Zigbee, and narrow bandwidths at frequencies such as 900 MHz to effect the required two-way communications. Thus, signals from utility company 230 can be forwarded via AMI meter 210 through to customer appliance 240a, and thereby effect a change of setting on customer appliance 240a, e.g., thermostat. However, as noted above, AMI communications path 220 is typically slow and therefore limits the effective functionality available to the consumer and the utility company.

Example of an Advanced Metering Solution: Control, Monitoring, and Conservation

FIG. 3 illustrates an advanced utility solution 300, according to an embodiment of the current invention. AMR meter 110 communicates usage via AMR communication link 320 to IP multi-media device 310. AMR communication link 320 proceeds by the conventional means such as using narrow bandwidths at frequencies such as 900 MHz. The IP multi-media device 310 is backwards compatible with existing AMR meters 110, and therefore no costly upgrade of AMR meters 110 is required in order to support the superior functionality of IP multi-media device 310. This embodiment of the current invention allows an AMR meter to work like a two-way AMI meter, which obviates the need to replace or physically upgrade existing legacy meters or to build up or maintain new communications infrastructure where IP or cellular service already exists. An example of IP multi-media device 310 is the OpenFrame® multi-media device developed and distributed by OpenPeak Inc. of Boca Raton, Fla. Further details of the OpenFrame® multi-media device are provided in the '090 application, which is incorporated herein in its entirety by reference.

Continuing to refer to FIG. 3, AMI meter 210 also communicates usage via AMI communication link 340 to IP multi-media device 310. As in the case of AMR meters, AMI communication link 340 uses conventional means, e.g., narrow bandwidths at frequencies such as 900 MHz. The IP multi-media device 310 is compatible with existing AMI meters 210. Importantly, because the IP multi-media device 310 has the ability to connect with either AMR meter 110 or AMI meter 210, the solution of FIG. 3 is not dependent on what type of legacy meter technology is used.

Still referring to FIG. 3, IP multi-media device 310 supports a two-way customer link 350 to central monitoring station 330 in a utility company. Customer link 350 can be any type of communications link, although those skilled in the art recognize that a broadband link is preferred for reasons of speed and functionality. Customer link 350 can be realized in a variety of ways. For example, such connectivity can be made via satellite, Wi-Fi, Ethernet, wireless, cellular radio, cable modem, power line or DSL. In an exemplary embodiment, customer link 350 includes the use, at least in part, of the Internet. Because IP multi-media device 310 is connected to the central monitoring station 330 via a broadband network, e.g., Internet, this architecture allows faster and more robust communication between an AMR meter or an AMI two-way meter and the utility company in receiving and responding to meter-reading and appliance-control requests. Accordingly, embodiments of the current invention realize a higher bandwidth to and from the consumer that is available through existing AMI systems. This allows for rapid querying of the state of a consumer's meter and the ability to send additional data to the consumer, such as text, graphic and audio/visual information, advertising and alerts.

Customer link 350 enables IP multi-media device 310 to forward usage data recorded by at least one of AMR meter 110 and AMI meter 210 to central monitoring station 330. In addition, customer link 350 enables IP multi-media device 310 to receive control signals, data and other information from central monitoring station 330. Control signals include, but are not limited to, requests for appliances to be shut down (and conversely to be allowed to power up). Control signals are particularly useful for central monitoring station 330 to shape its load at any time during the day so as to minimize the load peaks which typically result in the highest marginal prices to consumers. Thus, IP multi-media device 310 receives these control signals and either allows them to pass through to targeted household appliances that are not in direct communication with IP multi-media device 310, or alternatively redirects the control signals to appliances 240a through 240z, which are in communication with IP multi-media device 310.

As noted above, in addition to control signals, data is communicated to IP multi-media device 310, where such data can include variable pricing data. By providing variable pricing data to customers, customers can tailor their usage (e.g., by switching off certain appliances) to minimize their utility usage costs. The communication of variable pricing data to customers requires that the utility company through central monitoring station 330 be able to capture real-time usage data so that the appropriate variable price rates can be matched against the actual usage during each time interval of interest.

In addition to communicating with central monitoring station 330, IP multi-media device 310 also communicates with appliances 240a through 240z through internal communication link 360. In an exemplary embodiment, internal communications link 360 uses a Zigbee-based protocol. Other protocols and frequency bands commensurate with FCC regulations and the desired information bandwidths are also contemplated to be within the spirit of internal communications link 360. Appliances 240a through 240z include, but are not limited to, thermostats, water heaters, washers, dryers, and lighting. Appliances 240a through 240z can be controlled at the customer premises remotely by IP multi-media device 310 to accomplish conventional functionality (such as programming the thermostats to follow a temperature curve based on time of day, e.g., raise the temperature of residential premises at night while occupied, while lower the temperature of residential premises by day while unoccupied). Since IP multi-media device 310 in an exemplary embodiment is connected to the Internet via customer link 350, customers are also able to remotely program appliances 240a through 240z while away from the customer premises using remote connectivity, e.g., via the Internet.

Thus, in one embodiment of the present invention, a legacy AMR meter 110 can be provided with two-way communication functionality In another embodiment, a legacy AMI meter 210 can be provided with broadband communication functionality. In either embodiment, IP multi-media device 310 communicates with the legacy meter using the particular interface that the meter supports. The interface includes Zigbee, 900 MHz and narrowband powerline network interfaces. IP multi-media device 310 in turn communicates with the central monitoring station 330 and forwards usage data to central monitoring station 330. Using its bidirectional customer link 350, IP multi-media device 310 also receives commands from central monitoring station 330 such as meter reading requests. As noted above, IP multi-media device 310 can also communicate with controllable appliances 240a through 240z on the consumer premises. Controllable appliances 240a through 240z include thermostats, HVAC systems, hot-water heaters, etc. Communication with the controllable appliances 240a through 240z includes providing monitoring/control commands uses a suitable communication interface, e.g., a Zigbee transceiver with a Smart Energy Profile. IP multi-media device 310 can receive remote utility management commands (e.g., for demand-response control) from central monitoring station 330 and forward appropriate monitoring/control commands to the controllable appliances 240a through 240z in response to the remote utility management commands.

Smart versions of appliances 240a through 240z, or embodiments of IP multi-media device 310, can receive information such as weather forecasts and ambient humidity data via two-way customer link 350 from an appropriate provider of such information, e.g., weather service, weather.com, etc. In the case of a smart version of appliance 240a through 240z, IP multi-media device 310 forwards at least a portion of the received information, including a command if necessary, to smart version of appliance 240a through 240z. Based on this received weather forecast and ambient humidity information, appliances 240a through 240z can adjust their settings, e.g., controlling HVAC system based on received heat index information. As a further example, if appliance 240 knows the temperature will become cold in the evening, appliance 240 can shut off an air conditioner earlier. Similarly, based on humidity information, if the ambient humidity is low, appliance 240 can adjust the comfort temperature range to a higher temperature in summer, or a lower temperature in winter.

In addition to the ability to program and configure appliances 240a through 240z, IP multi-media device 310 can also include a computing device 1100 to execute algorithms so as to control appliances 240a through 240z in response to control signals, data and other information received from central monitoring station 330. For example, algorithms can be included so that appliances 240a through 240z are shut down or powered up depending on load conditions at the utility company. More sophisticated algorithms can be included so that appliances 240a through 240z can be controlled in response to real-time pricing fluctuations so that customer usage costs are thereby optimized. Other algorithms can be included so that appliances 240a through 240z can be controlled in accordance with a desired customer usage profile, a utility conservation objective, or other usage goals.

In addition to serving as the connection node on the customer premises and to incorporate algorithmic responses to control signals, data or information received from central monitoring station 330, IP multi-media device 310 can also include simple and user-friendly interface for display of information, and for ease of use in appliance control and programming. With respect to appliance programming, studies show that people almost never reprogram their programmable thermostat after initial installation. Thermostats typically have limited interfaces, making such programming difficult or, at best, tedious. Moreover, it is generally impossible to get a convenient display of what is actually programmed for the course of a week or to switch between set programs.

Embodiments of the current invention introduce several improvements to the programming of connected appliances 240a through 240z. User-friendly improvements include:
 (1) icon-driven user interface;
 (2) easy appliance setting, such as dragging the temperature setting over the scale using your finger. Optionally, one can allow users to drag multiple temperature settings over a timeline to program an entire day;
 (3) week-at-glance view by providing a graphical depiction of appliance settings (such as temperature settings) for the entire week;
 (4) guided wizard or explicit modification options;
 (5) definition of daily profiles, such as weekday, weekend, and away. For multi-zone control, embodiments of the current invention can further qualify the profiles to include "in bed", "watching TV", "dining" etc. These profiles can be assigned to days of the week or to specific calendar dates;
 (6) synchronize with a networked or local calendar to select specific profiles. For example, identify out-of-home vacations. With demand-response control, this information can be propagated to the utility to allow it to exert more aggressive control over the consumer premises;
 (7) provide comfort range and control range settings. A consumer defines a comfort range from a minimum temperature, $T_{min}$ (e.g., 66-77° F.). This covers the range for all seasons, avoiding the need for separate heat/cool settings. The thermostat controller (either the thermostat or a separate controlling device, such as OpenFrame® device from OpenPeak Inc.) will operate the furnace or air conditioner if the ambient temperature falls outside this range until the temperature drops (for air conditioning) or increases (for heat) by some value, $\Delta°$. This value can be preset to some value, such as 3° F., or can be learned by the device to optimize the duty cycle of the furnace and air conditioners; and
 (8) a graphically rich display of IP multi-media device 310, multiple on-wall appliances such as thermostats can be programmed from a central place. Thus, one simple user-friendly interface can replace a multiplicity of difficult to use interfaces for each of the appliances 240a through 240z. Exemplary embodiments of the simple and user-friendly interface are shown in FIGS. 4 and 5.

User Interface

FIG. 4 illustrates an example of an icon-based user interface of IP multi-media device 310. In addition to the time and date, an array of icons is displayed. The icon entitled "energy" represents the portal by which the consumer can access the functionality of IP multi-media device 310 described in this specification. Thus, "energy" provides access to the energy based monitoring, control and interface functionality. Since IP multi-media device 310 provides access to the Internet, other icons are used to identify access to various Internet sites relevant to the name of the icon. In FIG. 4, icons including contacts, weather, movies, media, cameras, Sudoku, news, horoscope, recipes, SIRIUS™ radio, calendar, stocks, YouTube™, Flicker®, as well as an icon permitting the consumer to access further icons that are not able to be included on the first page.

FIG. 5 illustrates an example of an interface for easy appliance setting, by enabling such actions as dragging the temperature setting over the scale using your finger. Displayed are inside and outside temperature and humidity. The normal HVAC controls of cool/heat and fan setting of on/auto/off are also shown and are available for manipulation. This example interface is in the folder identified as "Thermostat." Other folders are "Energy Use", "Ways to Save" and "Settings."

As noted above, the user interface of IP multi-media device 310 can display received information. In an exemplary embodiment, IP multi-media device 310 can display multiple views of information related to utility usage at the customer premises. By way of example, and not by way of limitation, those multiple views can include energy usage history, thermostat control interface, advertising interface, conservation tips and a settings view. The energy usage history information provided can include usage over any time interval (e.g., hourly, daily or monthly view), as well as accumulated cost over those same time periods. Such a display also can accommodate variable pricing as well as providing a visual display of actual usage and associated actual costs versus other parameters. For example, actual usage could be displayed versus goals, or versus peer group usage. An exemplary embodiment of the display capability is shown in FIGS. 6 and 7.

In a further optional feature, IP multi-media device 310 can also receive targeted advertising from outside sources (including central monitoring station 330) on its user interface, as well as providing utility usage conservation tips. An exemplary embodiment of the advertising portal functionality is shown in FIG. 8.

Figure 8:
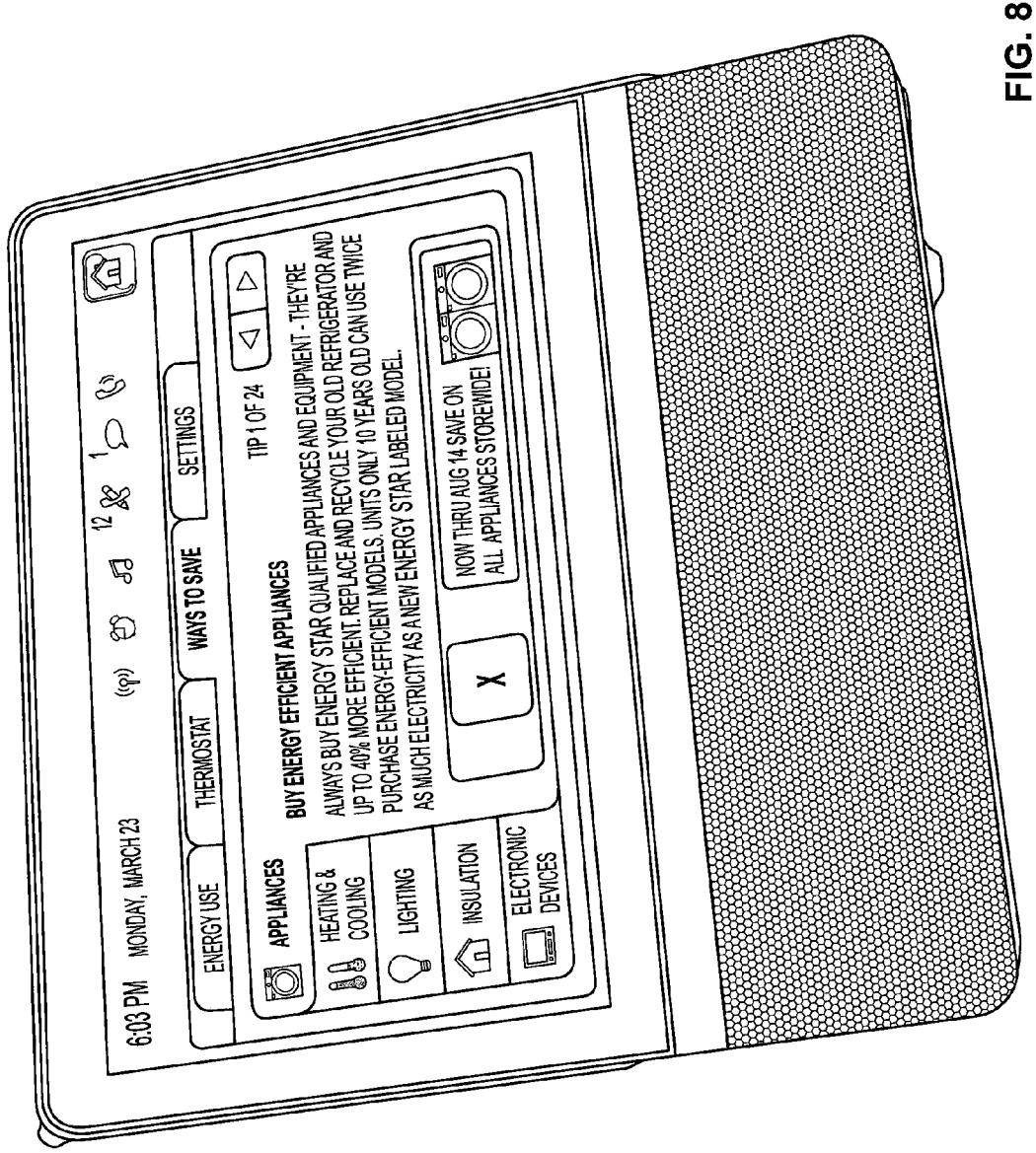

FIG. 8 illustrates another example user-interface that is made available to the consumer via the folder "Ways to Save". A message, with possible advertising or other associated content, is displayed. Various categories are available to and selectable by the consumer, including appliances, heating and cooling, light, insulation, and electronic devices.

Figure 9:
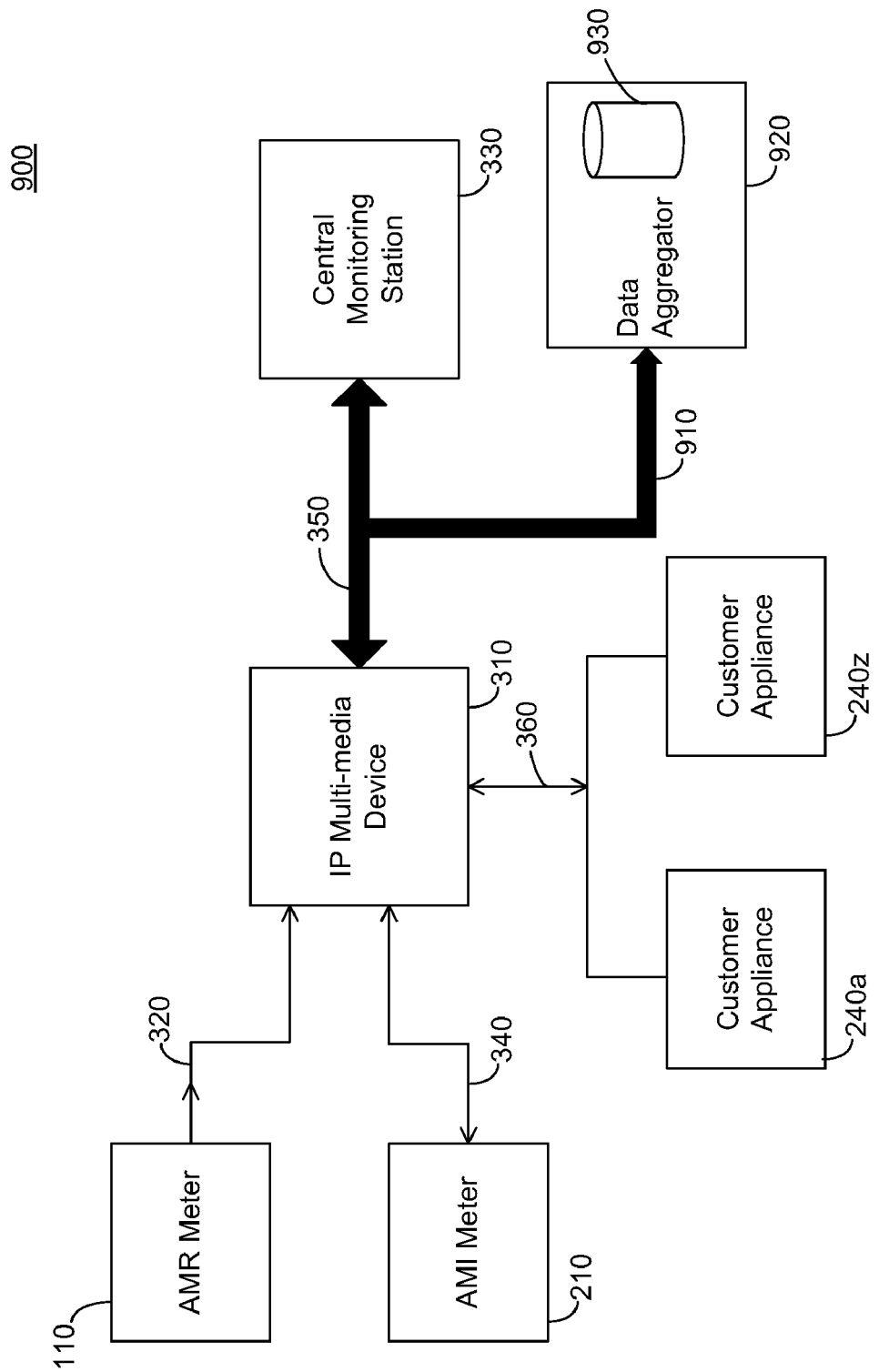

Finally, IP multi-media device 310 can optionally contain a further communications interface for connections to an external device, for various purposes including test purposes, maintenance, update purposes, as well as providing additional remote programming opportunities. Such a communications interface can be realized using Wi-Fi, Ethernet, Bluetooth, Zigbee, Z-Wave, 900 MHz transceiver or a USB port.
Example of an Advanced Metering Solution: Data Aggregation FIG. 9 illustrates another advanced metering solution, according to an embodiment of the current invention. Here, IP multi-media device 310 supports a database communications link 910 to a data aggregator 920, which includes database 930. Database communications link 910 can be any type of communications link, although those skilled in the art recognize that a broadband link is preferred for reasons of speed and functionality. For example, database communications link 910 can be realized using satellite, wireless, cable modem, power line or DSL approaches. In an exemplary embodiment, database communications link 910 includes the Internet. Database communications link enables IP multi-media device 310 to forward usage date recorded by at least one of AMR meter 110 and AMI meter 210 to database 930. Data aggregator 920 receives usage data from numerous customers, including those other customers that constitute a peer group to a given customer. Data aggregator 920 stores received usage data into database 930. From the usage data, statistical data and other aggregated data can be determined by data aggregator 920 and forwarded back to the customers. For example, average usage by customers in a particular peer group or community over a particular time period can be determined and forwarded to each customer for comparison and display purposes at IP multi-media device 310. Display at IP multi-media device 310 can show a visual comparison of historical usage with the average usage of customers in the particular peer group or community. In addition to manual adjustments by customers of usage based on receipt of this data, algorithms within IP multi-media device 310 can also be activated to respond to the receipt of aggregated or statistical data and make adjustments to appliances 240*a* through 240*z* in response to the received data.

Thus, providing such information to consumers encourages better energy use by providing consumers with comparative real-time feedback from a community of energy consumers. In addition, messages can be sent to participants relating to their relative consumption of energy, e.g. "Your neighbors with homes like yours have average electric bills of $400/month. Why is yours $600/month?" The community or peer concept can include the immediate neighborhood or comparable houses in the same climate zone. In addition, comparative usage (power, water, gas, etc.) can be shown in near-real time. For example, a graph of average, minimum and maximum usage can be shown overlaid on the consumer's usage.

In a further embodiment, better energy use can be enabled by providing real-time and appliance-specific data. For example, a plug-in monitoring module for power (or equivalently a flow-meter for water and gas) can provide a consumer with the amount of usage provided via a specific outlet. This data can be used to partition the consumer's graph of overall usage into components. Components can also be created from statistical data, such as known values for average washer/dryer use (at specific settings) or refrigerator use (again at specific settings).

Data aggregator 920 and central monitoring station 330 can be managed by separate organizations, with central monitoring station 330 being a part of a utility company and data aggregator 920 being a part of a separate third party. However, in an exemplary embodiment of the present invention, data aggregator 920 and central monitoring station 330 can both be a part of a utility company.

Figure 10:
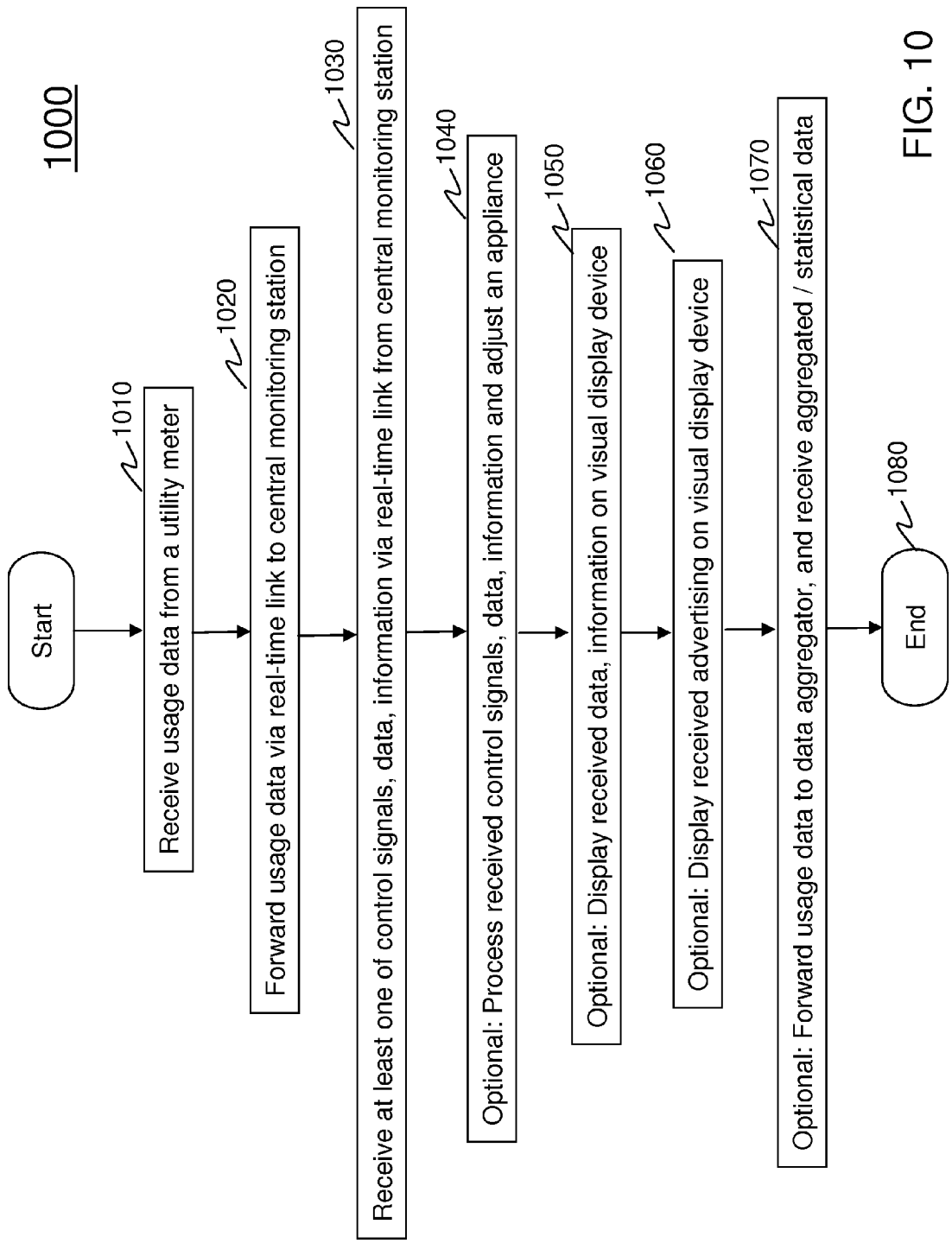
Figure 11:
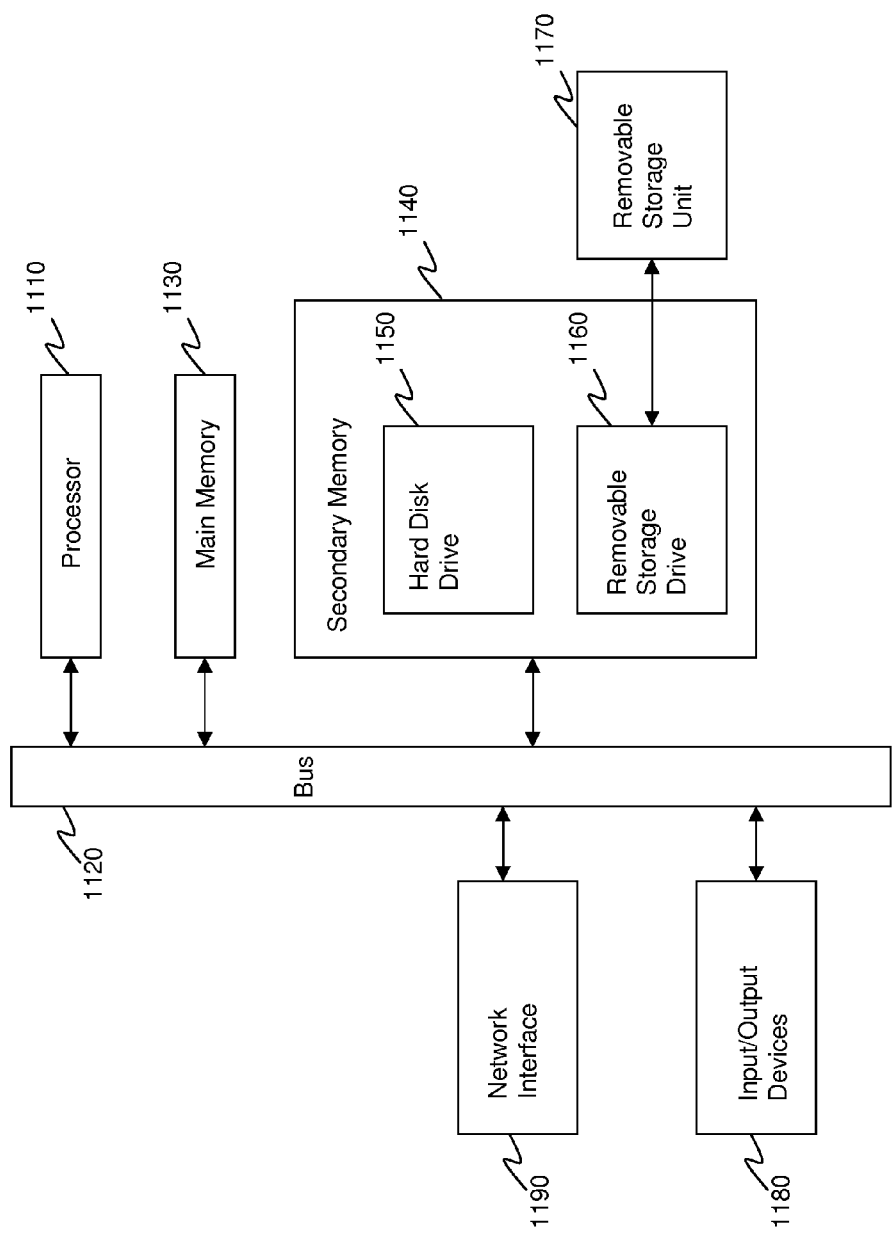

The breadth and scope of the present invention is not limited to electricity usage, control, monitoring and conservation. The use of AMR meters 110 and AMI meters 210 is for exemplary purposes only. Embodiments of the present invention are applicable to all utility usage, control, monitoring and conservation situations. Embodiments of the present invention include, but are not limited to situations involving electricity, gas and water. In an exemplary embodiment, IP multi-media device 310 can be connected to a mixture of electricity, gas and water meters, and also be connected the associated central monitoring stations for electricity, gas and water utility companies.
Example of a Method for Advanced Energy Use Control FIG. 10 provides a flowchart of an exemplary method 1000 that uses an IP multi-media device 310 to forward usage data to a central monitoring station 330, and to receive control signals from the central monitoring station 330, according to an embodiment of the present invention.

Figure 1:
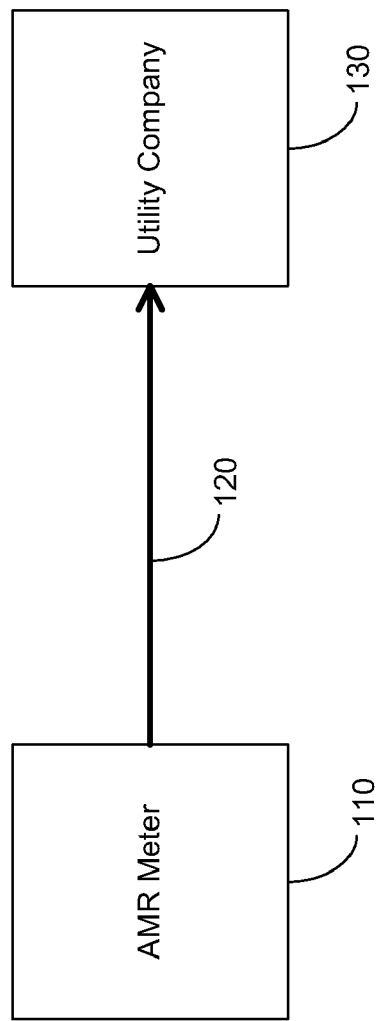
Figure 2:
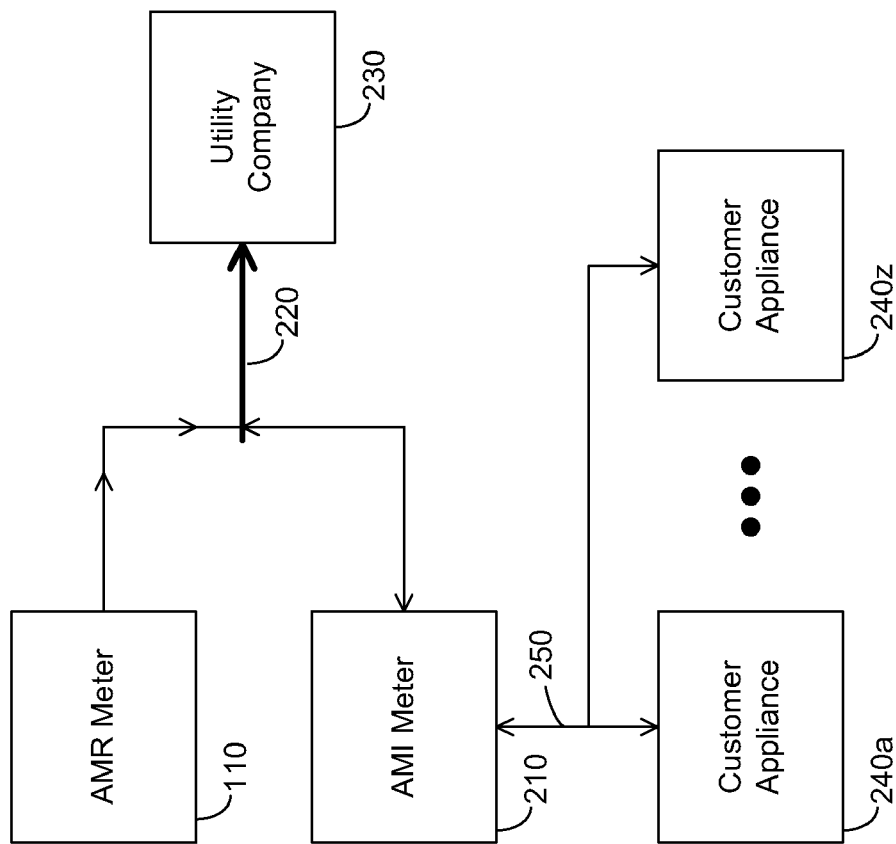
Figure 3:
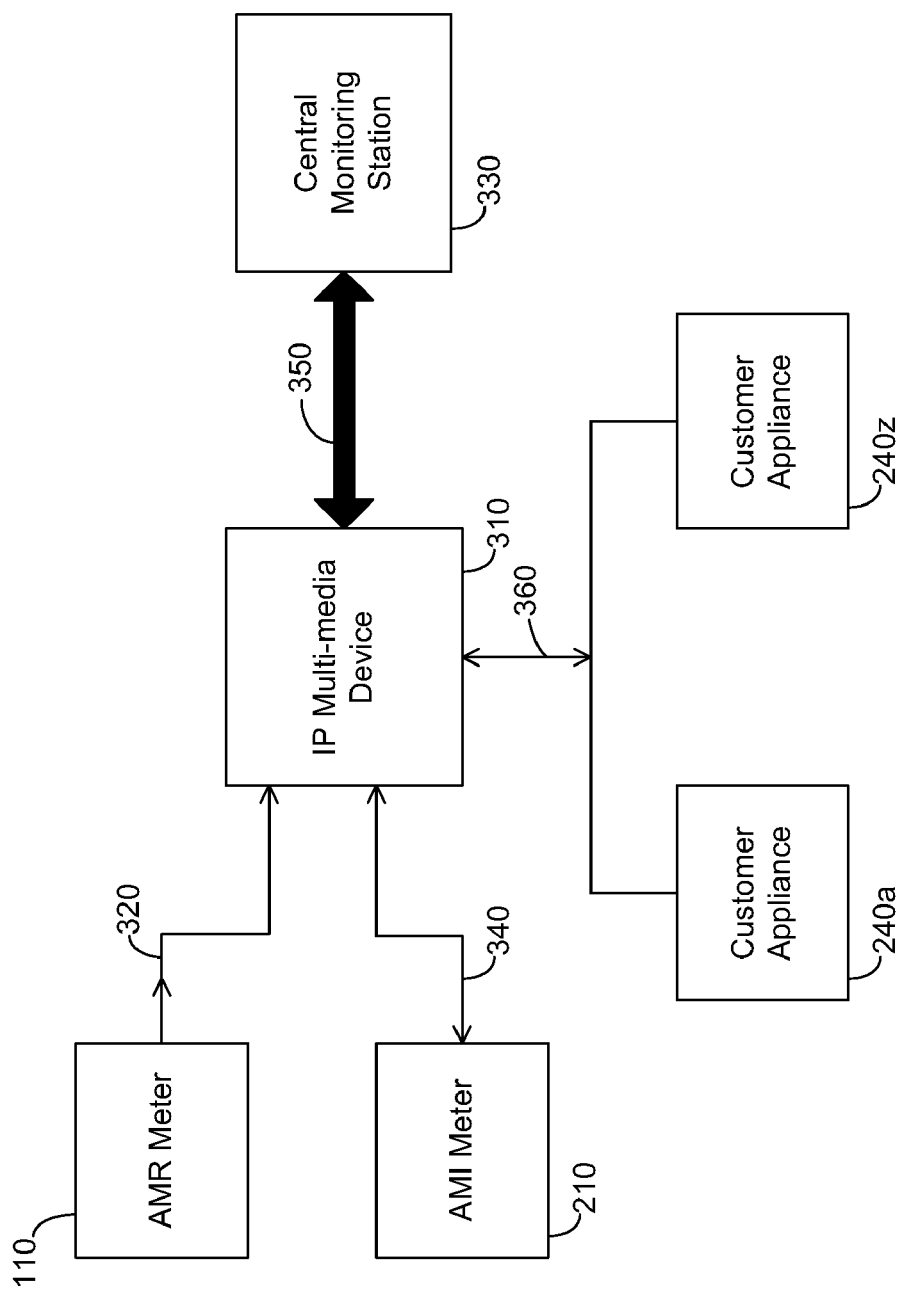
Figure 4:
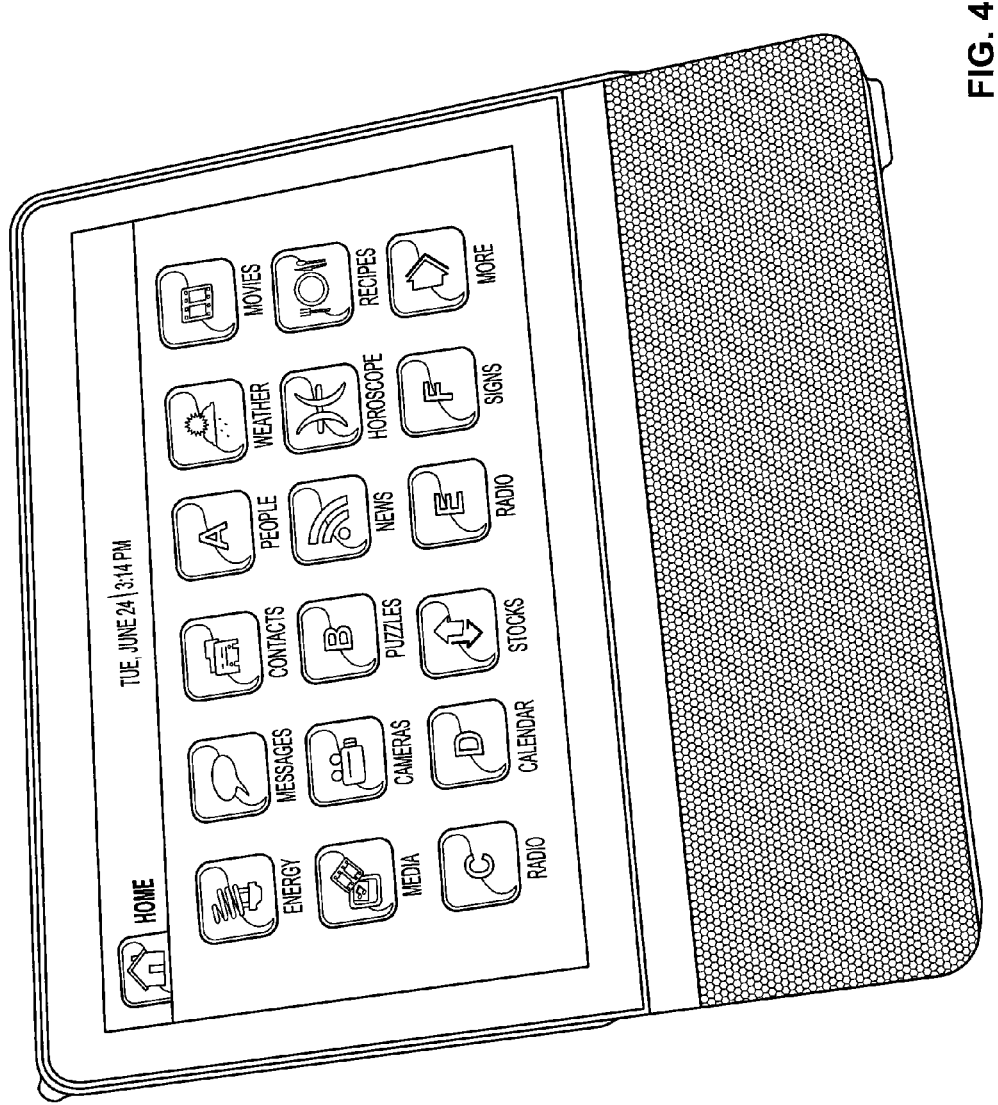
Figure 5:
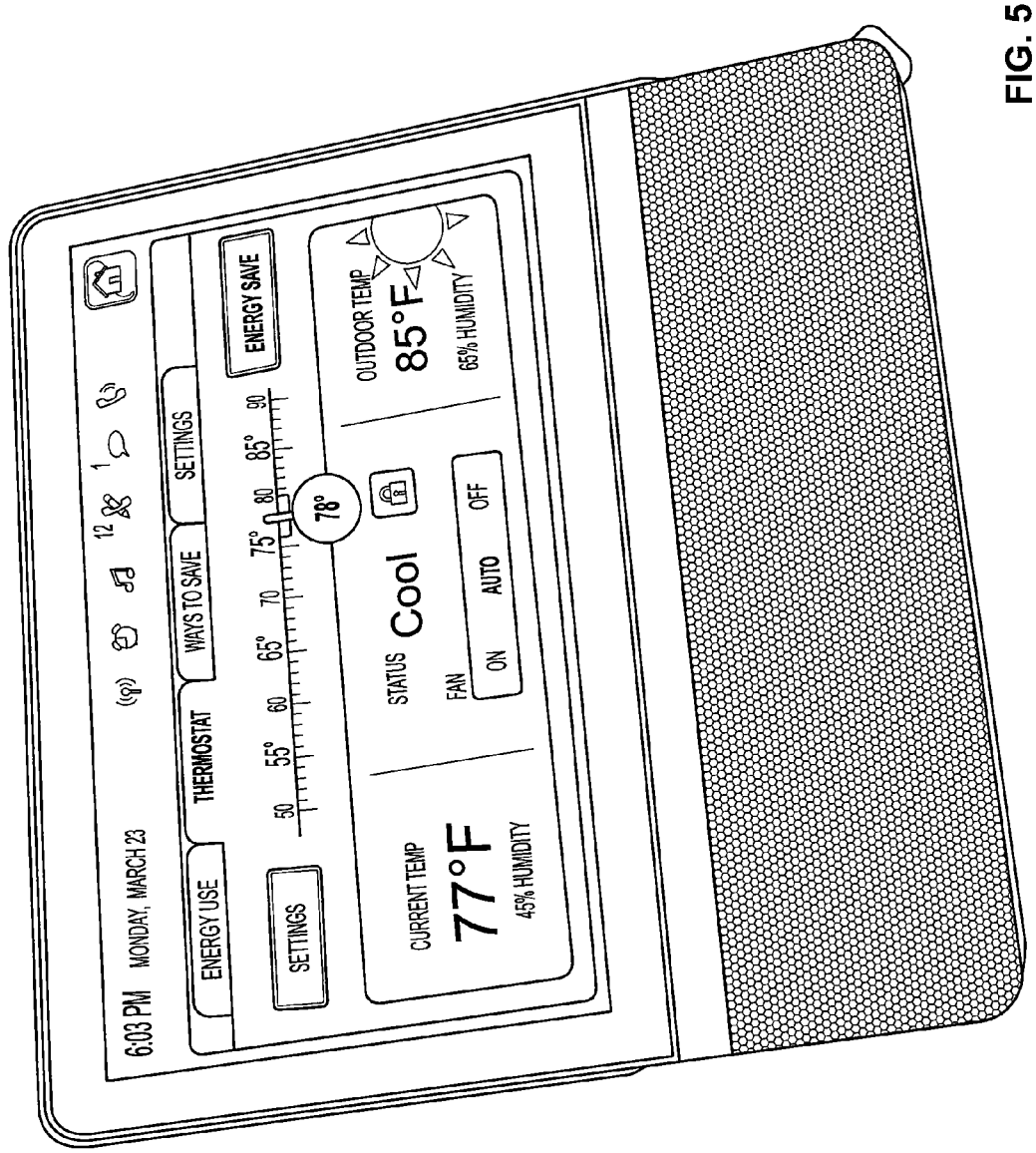
Figure 6:
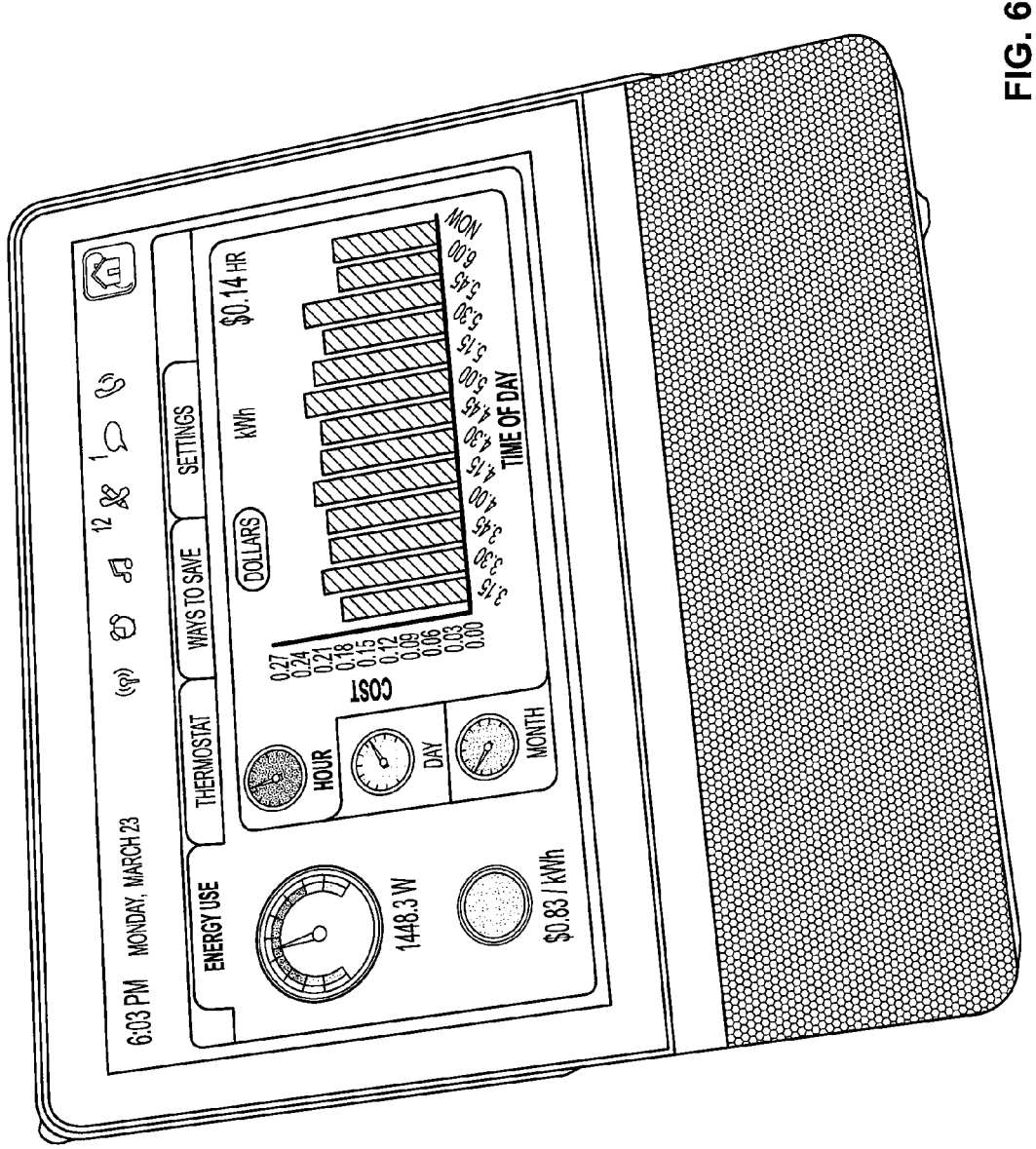
FIG. 6 illustrates an example user-interface that is made available to the consumer via the folder "Energy Use." Shown in FIG. 6 is information relating to the instantaneous power usage, the instantaneous pricing rate for energy use, as well as a bar graph representation of usage over a period of time. Selectable periods of time shown in this example are hour, day and month.
Figure 7:
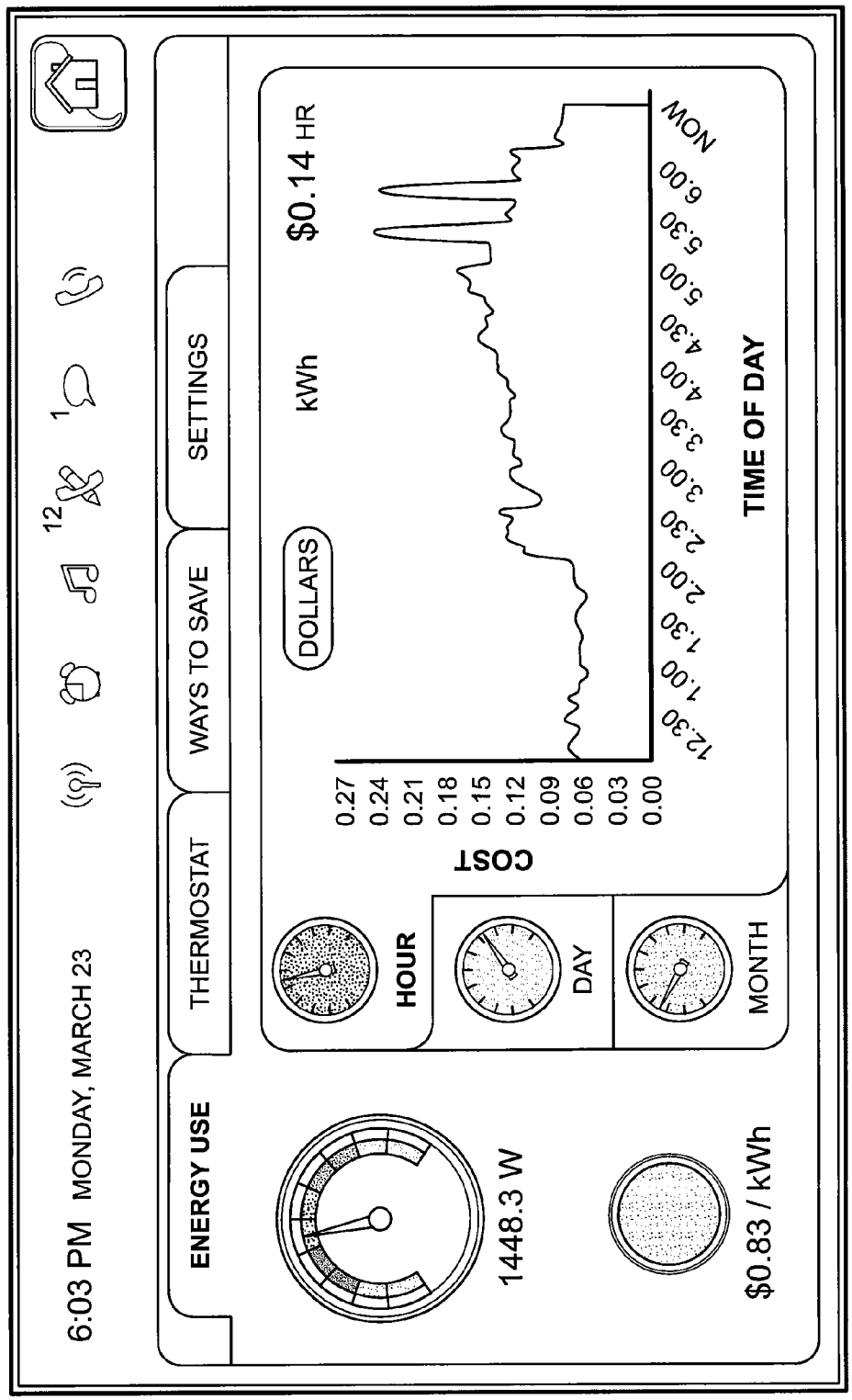
FIG. 7 illustrates another example user-interface that is made available to the consumer via the folder "Energy Use." Shown in FIG. 7 is information relating to the instantaneous power usage, the instantaneous pricing rate for energy use, as well as a continuous graph representation of cost over a period of time. Selectable periods of time shown in this example are again hour, day and month.

The process begins at step 1010. In step 1010, usage data is received by a communication device from a utility meter. The communication device could be provided by IP multi-media device 310, as illustrated in FIG. 3. The utility meter can be provided, for example, by at least one of AMR meter 110 and AMI meter 210, as illustrated in FIGS. 1, 2 and 3.

In step 1020, the received usage data is forwarded by the communication device to central monitoring station 330 via customer link 3100, as illustrated in FIG. 3.

In step 1030, at least one of control signals, data and information are received by the communication device from the central monitoring station via customer link 3100.

In optional step 1040, the received control signals, data and/or information are acted upon by IP multi-media device 310 and appliances are adjusted using intra-customer communications path 2100. The appliances can be provided, for example, by appliances 240a through 240z, as illustrated in FIG. 3.

In optional step 1050, the received data and/or information are displayed on a user interface of IP multi-media device 310. Appliances can be adjusted manually be customers. Alternatively, IP multi-media device 310 can apply algorithms on the basis of the received data and/or information, and adjust the appliances based on those algorithms.

In optional step 1060, advertising is received by IP multi-media device 310 and displayed on its user interface.

In optional step 1070, usage data can be forwarded via a database communications link 910 to a database 930, wherein aggregated and/or statistical data can be determined and returned via database communications link 910 to IP multi-media device 310 for at least one of display, manual action by customer, or an algorithmic adjustment of appliances 240a through 240z by IP multi-media device 310.

At step 1080, method 1000 ends.

Computer System Implementation

Computer 1100 includes one or more processors (also called central processing units, or CPUs), such as processor 1110. Processor 1110 can include the Intel Atom processor. Processor 1110 is connected to communication bus 1120. Computer 1100 also includes a main or primary memory 1130, preferably random access memory (RAM). Primary memory 1130 has stored therein control logic (computer software), and data.

Computer 1100 may also include one or more secondary storage devices 1140. Secondary storage devices 1140 include, for example, hard disk drive 1150 and/or removable storage device or drive 1160. Removable storage drive 1160 represents a floppy disk drive, a magnetic tape drive, a compact disk drive, an optical storage device, tape backup, ZIP drive, JAZZ drive, etc.

Removable storage drive 1160 interacts with removable storage unit 1170. As will be appreciated, removable storage unit 1160 includes a computer usable or readable storage medium having stored therein computer software (control logic) and/or data. Removable storage drive 1160 reads from and/or writes to the removable storage unit 1170 in a well known manner.

Removable storage unit 1170, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1100, or multiple computer 1100s to perform any combination of the functions described herein.

Computer programs (also called computer control logic) are stored in main memory 1130 and/or the secondary storage devices 1140. Such computer programs, when executed, direct computer 1100 to perform the functions of the present invention as discussed herein. In particular, the computer programs, when executed, enable processor 1110 to perform the functions of the present invention. Accordingly, such computer programs represent controllers of the computer 1100.

Computer 1100 also includes input/output/display devices 1180, such as monitors, keyboards, pointing devices, etc.

Computer 1100 further includes a communication or network interface 1190. Network interface 1190 enables computer 1100 to communicate with remote devices. For example, network interface 1190 allows computer 1100 to communicate over communication networks, such as LANs, WANs, the Internet, etc. Network interface 1190 may interface with remote sites or networks via wired or wireless connections. Computer 1100 receives data and/or computer programs via network interface 1190.

The invention can work with software, hardware, and operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system, comprising:
   a utility meter including a communications interface for communicating usage data; and
   an IP multi-media device comprising:
   a first communications interface configured to receive the usage data from the utility meter,
   a second communications interface configured to communicate in real-time with a central monitoring station, wherein the second communications interface transmits the received usage data to the central monitoring station and receives at least one of control signals, data and information from the central monitoring station, and a third communications interface configured to communicate in real-time with a database aggregator, wherein the third communications interface transmits the received usage data to the database aggregator and receives at least one of aggregated information and statistical information from the database aggregator, and wherein the at least one of aggregated information and statistical information includes comparative real-time feedback from a community of utility consumers.

2. The system of claim 1, wherein the utility meter is an automatic meter reading (AMR) meter.

3. The system of claim 1, wherein the utility meter is an advanced metering infrastructure (AMI) meter.

4. An apparatus, comprising:
a first communications interface configured to receive usage data from a utility meter;
a second communications interface configured to communicate in real-time with a central monitoring station, wherein the second communications interface transmits the received usage data to the central monitoring station and receives at least one of control signals, data and information from the central monitoring station; and
a third communications interface configured to communicate in real-time with a database aggregator, wherein the third communications interface transmits the received usage data to the database aggregator and receives at least one of aggregated information and statistical information from the database aggregator, wherein the at least one of aggregated information and statistical information includes comparative real-time feedback from a community of utility consumers.

5. The apparatus of claim 4, wherein the utility meter is at least one of an electricity usage meter, a gas usage meter and a water usage meter.

6. The apparatus of claim 4, wherein the second communications interface communicates with the central monitoring station using at least in part an Internet protocol network.

7. The apparatus of claim 4, further comprising:
a visual interface configured to display at least one of the data and information received from the central monitoring station.

8. The apparatus of claim 4, further comprising:
a fourth communications interface configured to communicate real-time with an appliance, wherein the fourth communications interface transmits instructions to the appliance.

9. The apparatus of claim 8, further comprising:
a visual interface configured to receive the instructions for transmission to the appliance.

10. The apparatus of claim 8, further comprising:
a processing device configured to algorithmically respond to at least one of the control signals, data and information and generate the instructions for transmission to the appliance by the fourth communications interface.

11. The apparatus of claim 4, wherein the second communications interface and the third communications interface are the same interface, and communicate using at least in part an Internet protocol network.

12. The apparatus of claim 4, further comprising:
a fourth communications interface for connections to an external device, wherein the fourth communications interface includes the use of at least one of Wi-Fi, Ethernet, Bluetooth, Zigbee, Z-Wave, 900 MHz transceiver and a USB port.

13. A method, comprising:
receiving, with a communications device, usage data from a utility meter;
transmitting, with the communications device, the usage data to a central monitoring station via a first real-time communications link;
receiving, with the communications device, at least one of control signals, data and information from the central monitoring station via the first real-time communications link;
transmitting, with the communications device, the usage data to a database aggregator via a second real-time communications link; and
receiving, with the communications device and from the database aggregator, at least one of aggregated information and statistical information, wherein the at least one of aggregated information and statistical information includes comparative real-time feedback from a community of utility consumers.

14. The method of claim 13, wherein the receiving usage data from a utility meter includes receiving usage data from at least one of an electricity usage meter, a gas usage meter and a water usage meter.

15. The method of claim 13, wherein the transmitting and receiving with the central monitoring station including using at least in part an Internet protocol network.

16. The method of claim 13, further comprising:
displaying, using a visual interface, at least one of the data and information received from the central monitoring station.

17. The method of claim 13, further comprising:
adjusting at least one appliance, wherein the at least one appliance is communicatively coupled to the communications device.

18. The method of claim 17, wherein the adjusting is responsive to instructions received via a visual interface.

19. The method of claim 17, further comprising:
generating, by a processing device, an instruction based on algorithmic processing of at least one of the received control signals, data and information; and
wherein the adjusting at least one appliance includes using the generated instruction.

20. The method of claim 13, wherein the transmitting and receiving with the database aggregator using the second real-time communications link includes using, at least a portion of the first real-time communications link.

21. The method of claim 13, further comprising:
receiving, using an external port of the communications device, at least one of test, maintenance, update and remote instructions, wherein the external port includes the use of at least one of Wi-Fi, Ethernet, Bluetooth, Zigbee, Z-Wave, 900 MHz transceiver and a USB port.

* * * * *